P. C. Laub.
Churn.
N° 76206. Patented Mar. 31, 1868.
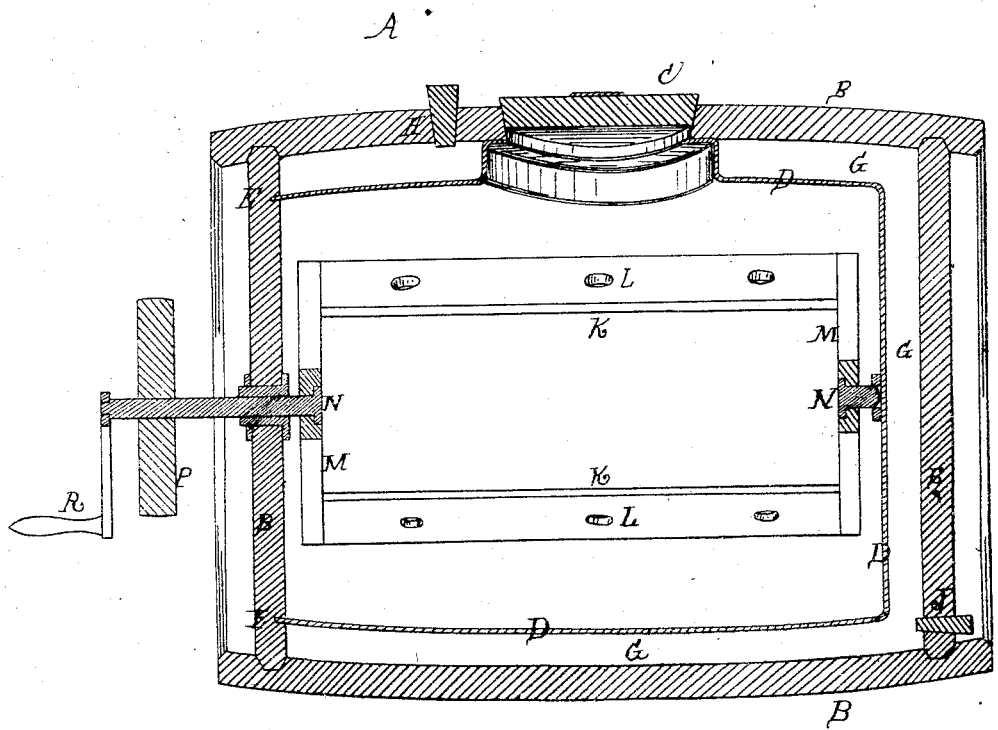
Witnesses;
Martin Buell
L. Inch
Inventor:
Peter C Laub
By his Atty
J. F. Ruigart

United States Patent Office.

PETER C. LAUB, OF ALLENTOWN, ASSIGNOR TO HIMSELF AND SAMUEL SHAFFER, OF WILLIAMSPORT, PENNSYLVANIA.

Letters Patent No. 76,206, dated March 31, 1868.

IMPROVEMENT IN CHURNS.

The Schedule referred to in these Letters Patent and making part of the same.

TO ALL WHOM IT MAY CONCERN:

Be it known that I, PETER C. LAUB, of Allentown, Lehigh county, State of Pennsylvania, have invented an Improved Barrel-Churn; and I do hereby declare the following to be an exact description thereof, reference being had to the accompanying drawings, and to the letters of reference marked thereon, making a part of this specification, in which—

A represents a sectional view of the churn; B, the barrel-shape or cylinder, formed of staves and hoops; C, the aperture through which the cream is poured; D D, the sides or division in the inside, form an inner cylinder, corresponding with the outer, and attached to the outer at the centre aperture C, and to the one end of the churn at E E. This division D forms a chamber, G, around the inside of the churn, the division or partition being made of zinc, or other suitable material, and the chamber G is for the purpose of containing hot or cold water, to give the proper temperature to the cream, the water being poured into the chamber at H, and drawn off at J, when required. The beaters K K have apertures, L L, to dash and break the cream, and they are attached to cross-arms, M M, and operate on two short axles or pivots, N N, and they are operated by a band-wheel P, or crank R.

I do not claim a zinc concave division, forming a water-chamber in a square-box churn, as that has been used; but

What I claim as my invention, and desire to secure by Letters Patent, is—

The combination of the barrel-shaped churn B with its inner corresponding-shaped division D and chamber G, when constructed, arranged, and operated as herein described, and for the purposes set forth.

PETER C. LAUB.

Witnesses:
J. FRANKLIN REIGART,
EDM. F. BROWN.